United States Patent
Schmierer

(10) Patent No.: US 8,029,177 B2
(45) Date of Patent: Oct. 4, 2011

(54) LIGHTING DEVICE WITH AT LEAST ONE ILLUMINANT UNIT FOR VEHICLES, PREFERABLY MOTOR VEHICLES

(75) Inventor: Arne Schmierer, Kirchheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 45 days.

(21) Appl. No.: 11/742,824

(22) Filed: May 1, 2007

(65) Prior Publication Data
US 2007/0258253 A1 Nov. 8, 2007

(30) Foreign Application Priority Data

May 3, 2006 (DE) .......................... 10 2006 021 973

(51) Int. Cl.
*F21S 8/10* (2006.01)
(52) U.S. Cl. ................ 362/545; 362/217.1; 362/217.11; 362/217.15; 362/249.02; 362/487; 362/540; 362/543; 362/544; 362/548; 362/549
(58) Field of Classification Search .................. 362/487, 362/543, 545, 548, 549, 800, 217.1, 217.11, 362/217.15, 362, 540, 544, 249.02, 249.03, 362/418, 427, 513, 523
See application file for complete search history.

(56) References Cited

U.S. PATENT DOCUMENTS

| | | | | |
|---|---|---|---|---|
| 5,490,049 A | * | 2/1996 | Montalan et al. | 362/240 |
| 5,561,414 A | * | 10/1996 | Chin | 340/432 |
| 6,203,191 B1 | * | 3/2001 | Mongan | 374/43 |
| 6,472,823 B2 | * | 10/2002 | Yen | 315/112 |
| 6,727,652 B2 | * | 4/2004 | Sivacumarran | 315/58 |
| 6,834,980 B2 | * | 12/2004 | Okano et al. | 362/640 |
| 6,902,308 B2 | * | 6/2005 | Love | 362/545 |
| 2002/0149933 A1 | * | 10/2002 | Archer et al. | 362/234 |
| 2003/0058642 A1 | * | 3/2003 | Chu et al. | 362/240 |
| 2003/0169160 A1 | * | 9/2003 | Rodriguez Barros et al. | 340/426.1 |
| 2005/0052128 A1 | * | 3/2005 | Nakanishi | 313/506 |
| 2006/0268565 A1 | * | 11/2006 | Chang | 362/540 |

* cited by examiner

*Primary Examiner* — Diane Lee
*Assistant Examiner* — Mary Zettl
(74) *Attorney, Agent, or Firm* — Reising Ethington P.C.

(57) ABSTRACT

A lighting device with at least one lighting unit for vehicles, preferably motor vehicles. The lighting device comprises at least one illuminant unit with one circuit board, and with at least one illuminant attached to the circuit board, connected to the conductive paths of the circuit board through contacts. The illuminant is positioned at the front face of the circuit board in order to configure the lighting device so that it can be manufactured simply and economically in a particularly flat configuration and in any curved shape. The lighting device is advantageously used in vehicles, preferably in motor vehicles.

14 Claims, 8 Drawing Sheets

LIGHTING DEVICE WITH AT LEAST ONE ILLUMINANT UNIT FOR VEHICLES, PREFERABLY MOTOR VEHICLES

BACKGROUND OF THE INVENTION

The invention is related to a lighting device with at least one illuminant unit for vehicles, preferably motor vehicles, according the German patent application DE 102006021973.2, which is incorporated by reference.

Lighting devices with illuminant carriers, in which LEDs are disposed on circuit boards, are known. These circuit boards may have conductive paths on both surfaces of the circuit board, whereby the circuit board material is typically resin impregnated board, fiber-reinforced resin, and/or ceramics. The circuit boards have conductive tracks that serve for contacting and positioning of the LEDs. Furthermore, additional electronic components are frequently disposed on the circuit boards in addition to the LEDs.

The assembly of the LEDs onto a circuit board into an illuminant unit for the utilization in lighting devices is highly intricate due to the LEDs' requiring to be brought into an exact installation position. Such illuminant units require extensive installation space in lighting devices, which makes the lighting devices or their respective lighting device housings complicated and bulky. Curved lighting device housings furthermore require that the circuit boards be provided in individual segments, requiring positioning according to the lighting device/housing contour. This requires a plurality of fastening and positioning means, typically rendering the lighting device/housing very complex and expensive.

Such conventional lighting devices or illuminant units are not self-contained components, but rather require additional components for their optically efficient functioning that also need securing and fastening within the lighting device and/or its housing. The dimensions of all components relative to each other are of paramount importance, as even small variances can produce large optical errors. Due to the large installation space required, these lighting devices, or their housings need to be configured appropriately spacious corresponding to the additional elements to be installed. The resulting additional complexity causes weight increase and higher material use and, considering the increased assembly labor cost, leads to a significant cost increase for the complete Module. Additionally, these parameters have a significantly restrictive impact on the design options, or allow the implementation of specific designs only through extreme engineering and fabrication measures.

SHORT DESCRIPTION OF THE INVENTION

The object of the invention is to configure the lighting device with illuminant unit of this kind, so that a particularly compact, flat, and easy to install lighting device, with a discretionary shape, and made up of a minimal number of parts, can be manufactured in a simple and cost efficient manner.

This object is accomplished in this kind of lighting device with illuminant unit attached to the circuit board and connected to conductive paths on the circuit board through contacts, wherein the illuminant is positioned at the narrow face of the circuit board.

In the lighting device according to the invention particular emphasis is being given to a very flat design incorporating a circuit board with discretionary shape. Herein the illuminant unit is provided such that the narrow face of the circuit board is pointing in the primary beam direction of the lighting device. The illuminants are substantially located along the narrow face of the circuit board and connected to the conductive paths of the circuit board, which leads to a illuminant unit of particularly flat configuration. Such flat configured illuminant units can be installed in very small and flat lighting device housings, which leads to a very flat and simple component. The illuminant unit is outfitted for instance with standardized LEDs as illuminants, wherein, in contrast to two-dimensional positioning of the LEDs, no particular complications need to be anticipated during assembly. The narrow, or front face of the circuit board is readily accessible and can be milled, cut, or die-punched very accurately. As no additional optical components require very accurate positioning at relatively large distances from each other, a minimal variance during installation is of much lesser impact as compared to conventional lighting device configurations. The installation effort is significantly reduced and installation can occur simply and quickly compared to typical configurations Due to the use of semi-conductor components, lighting devices of such manufacture usually provide for a durability covering their entire life cycle. Furthermore such lighting devices can be provided as inserts into, for instance, an injection mold. For example, in case of a tail light for a vehicle, the plastic material of the entire tail light, or of a housing, may integrate the lighting device into a complete module through respective cross linking, or through at least partial embedding of the lighting device during the injection molding process.

The combination of a plurality of illuminant units into a larger module can be provided at significant weight and space savings as compared to currently used lighting devices. For lighting devices e.g. in exterior rear view mirrors, these attributes signify a considerable improvement, since, in addition to the space and weight savings, the thermal integration as well as the potential for inducement of vibration into the entire lighting device assembly is significantly reduced. Finally, said lighting device configuration provides for design solutions that can not be realized with present techniques.

Furthermore, this concept provides for simplified mounting and installation in housings or other devices. Thus, aerodynamically more advantageous implementations of the lighting devices/housings can be achieved through the smaller volume and the particularly flat configuration, or these lighting devices can be disposed in the separation plane of housings, so that these lighting devices are minimally conspicuous, thus do not have any negative influences upon the overall design.

The fastening of said lighting units is effected through a threaded or clip connection to other components, for instance of a housing, or to already existing brackets.

Additional features of the invention can be derived from the dependent claims, the description, and the drawings.

DESCRIPTION OF THE DRAWINGS

The invention is described in more detail through several embodiments shown in the drawings. They show in:

FIG. 1 shows an illuminant unit 2 with illuminants disposed at the front face of a circuit board 6. The circuit board 6 is a circuit board, common in the electronics sector, typically comprised of resin impregnated fiber board, fiber reinforced resins, or ceramics. On the top and bottom surfaces of the circuit board 6 conductive paths 7 are applied with respective conductive path connections 7 provided to the illuminants 3.

Figure 1:
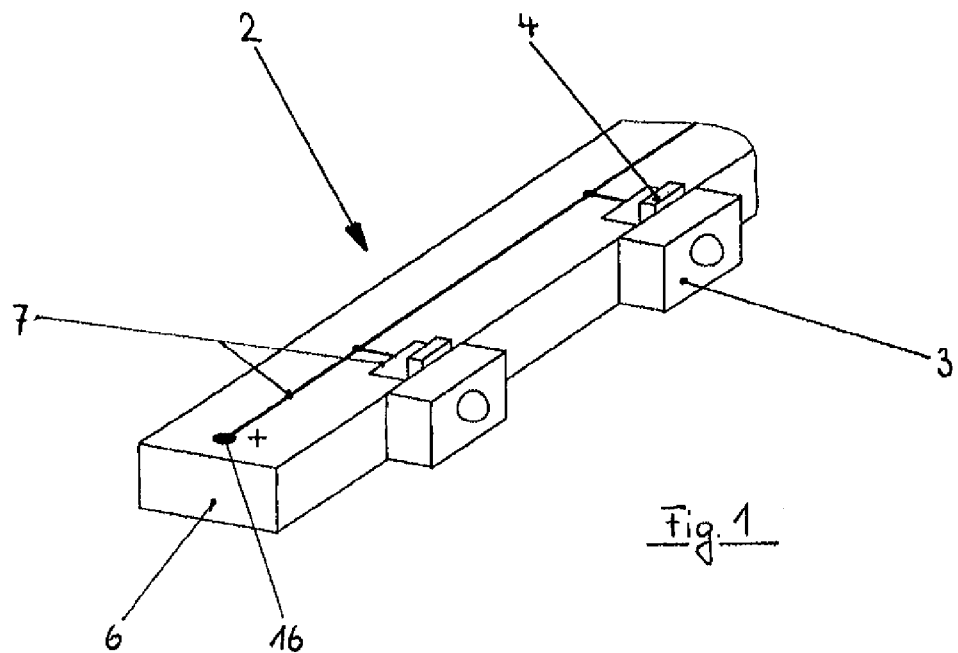
FIG. 1 an illuminant unit with illuminants disposed at the front face of a circuit board, FIG. 2 two illuminant units integrated into one block, FIG. 3 a schematic rendering of a section through the illuminant unit according to FIG. 1 utilizing an SMD-LED.

The illuminants 3 are disposed at the front face of the circuit board 6, wherein a contact/soldering tag 4 of the illuminant 3 is located, narrowly gapped, in immediate proximity of each conductive path connection 7. These contacts 4 are preferably connected to the conductive path connections 7 though soft soldering, so that the existing gap between the contacts 4 and the conductive path connections 7 is bridged reliably. When power is applied to the conductive paths at the top and bottom surfaces of the circuit board 6, a current can flow through the soldered connections between the conductive paths 7 and the contacts, which can make the illuminants light accordingly.

In order to be able to build a particularly flat illuminant unit 2, it is preferable to utilize SMD-LEDs as illuminants 3, as shown in this exemplary embodiment. SMD-LEDs are surface mounted components of extremely compact configuration. By utilizing such components that essentially do not, or may protrude only minimally above the thickness of the circuit board 6, it becomes feasible to fabricate particularly flat and line/ribbon shaped lighting devices. The height of the illuminant unit 2 shown in FIG. 1 determines the essential thickness dimensions of a completely installed lighting device, wherein at its front face, a few illuminants 3 evenly distributed over the length of the circuit board 6, or a plurality of strung-together illuminants 3 can be used.

Figure 2:
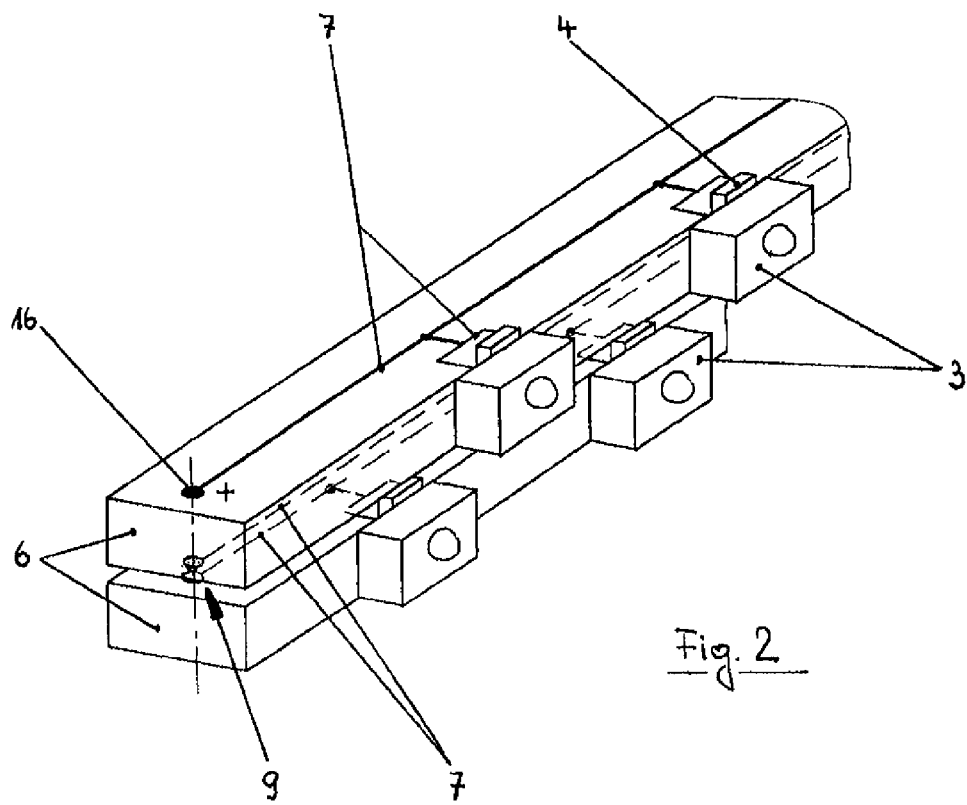

An illuminant unit 2 may be combined with additional illuminant units 2 into an illuminant block by linking them together in parallel. Herein for instance, two circuit boards 6 are brought into close proximity with illuminants 3 soldered to their front faces as shown in FIG. 2. This lends itself to, for instance, connecting the conductive paths 7 via the connection contacts 9 of the two circuit boards 6 by means of wrap connecting or soldering. Also this design measure limits the thickness of the block forming illuminant units 2 to the respective thicknesses of the individual circuit boards 6. It is herein self-evident that illuminant units 2 can be used, either with densely linked or staggered illuminants 3. Thus, a particularly high light output can be accomplished with minimum overall dimensions.

The illuminant units 2 combined into a block have, similar to a single illuminant unit 2, only two contact points 16 each, with one respective contact point 16 on the top surface of the upper circuit board 6, or on the bottom surface of the lower circuit board 6. In order to avert unwanted contacts between closely adjacent illuminant units 2 within the block, the circuit boards 6 may be coated with a protective lacquer or another insulating material.

Figure 3:
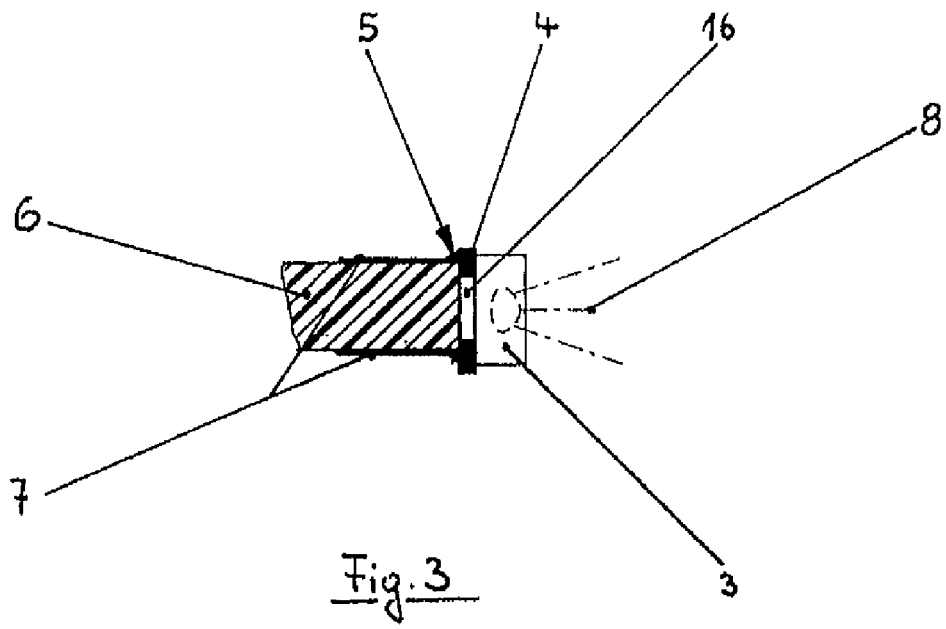

FIG. 3 shows a schematic section through the illuminant unit 2 according to FIG. 1. The illuminant 3, in the present embodiment a SMD-LED, is disposed on the front face of the circuit board 6. The contacts/soldering tabs 4 of the LED 3 extend slightly beyond the circuit board 6 in upward and downward direction, so that a fillet joint is created between the contact/soldering tab 4 and the conductive path 7. Such a connection assures a reliable contact between the LED 3 and the conductive path 7. This connection moreover achieves a solid mechanical connection between the LED 3 and the circuit board 6.

The contacts/soldering tabs 4 are attached to the LED 3, so that upon installation of the LED 3 at the front face of the circuit board 6 an air gap 39 is created between both components. Such air gaps ensure a definite galvanic separation between the two contacts. It is furthermore possible to insert materials with particularly suited thermal transfer properties into this air gap 39. These can be for instance heat conducting pastes or thin metal strips.

A particularly meticulous positioning of the LED 3 relative to the front face of the circuit board 6 is not necessary, since small angular misalignments are insignificant as to the light emission characteristics of the LED 3. The circuit boards 6 are typically precision-cut under a 90 degree angle, so that the positioning of an LED 3 can be accomplished merely through the slightly protruding contacts/soldering tabs 4.

Figure 4:
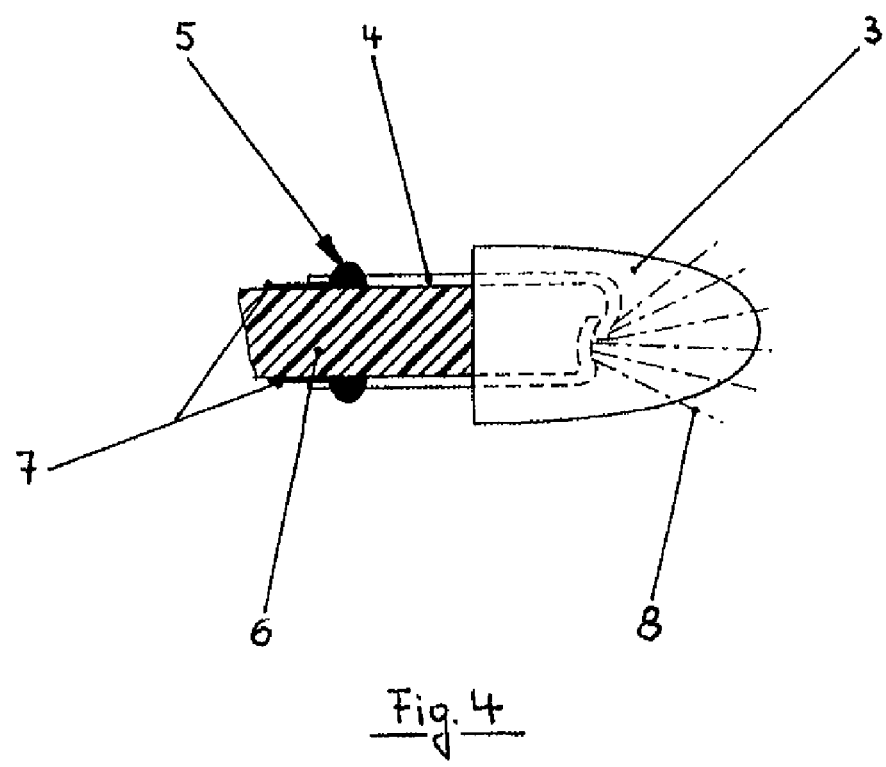
FIG. 4 a schematic rendering of a section through the illuminant unit according to FIG. 1 utilizing an LED in a standard configuration, FIG. 5 an illuminant unit with illuminants disposed at the front face of a curved circuit board, FIGS. 6-9 different embodiments of illuminant units in light device housings, FIG. 10 an external rear view mirror with an inserted lighting device as shown in FIGS. 6 through 9, FIG. 11 a sectional view of the external rear view mirror according to FIG. 10, FIG. 12 a schematic sectional view of the external rear view mirror according to FIG. 10 with fastening means for mounting the lighting device in the external rear view mirror.

Another variant of LEDs 3 is shown in FIG. 4. Instead of an SMD-LED as described in FIGS. 1 through 3, a standardized LED 3 is utilized herein. The width dimension of this standardized LED 3 is significantly larger than that of the LED 3 mentioned above. These LEDs 3 also do not possess soldering tabs 4, but they are provided with long, wirelike contacts 4. For mounting on the front face this LED 3 is slid over the circuit board 6 with the wire like contacts 4, so that the contacts 4 come into contact with the conductive paths 7 and are joined through soft soldering. Due to a larger contact area, the resultant soldering points 5 are also provided larger, resulting in a larger contact surface during the soldering process. Through this contact surface this variant lends itself to substituting the soft soldering process e.g. with a laser welding process. This is advantageous, since this joining method can be performed very quickly. No heating up and/or cooling down and positioning times have to be considered. Hereby thermal stress is also lower, since considerably more material is available in the contacts 4, as well as a larger material volume of the LED 3 for absorbing the inducted thermal energy. This embodiment, while occupying more space constitutes a cost effective solution, particularly suited when the LEDs 3 of the illuminant unit 2 are, for instance, required to protrude into reflector or other openings during assembly.

Figure 5:
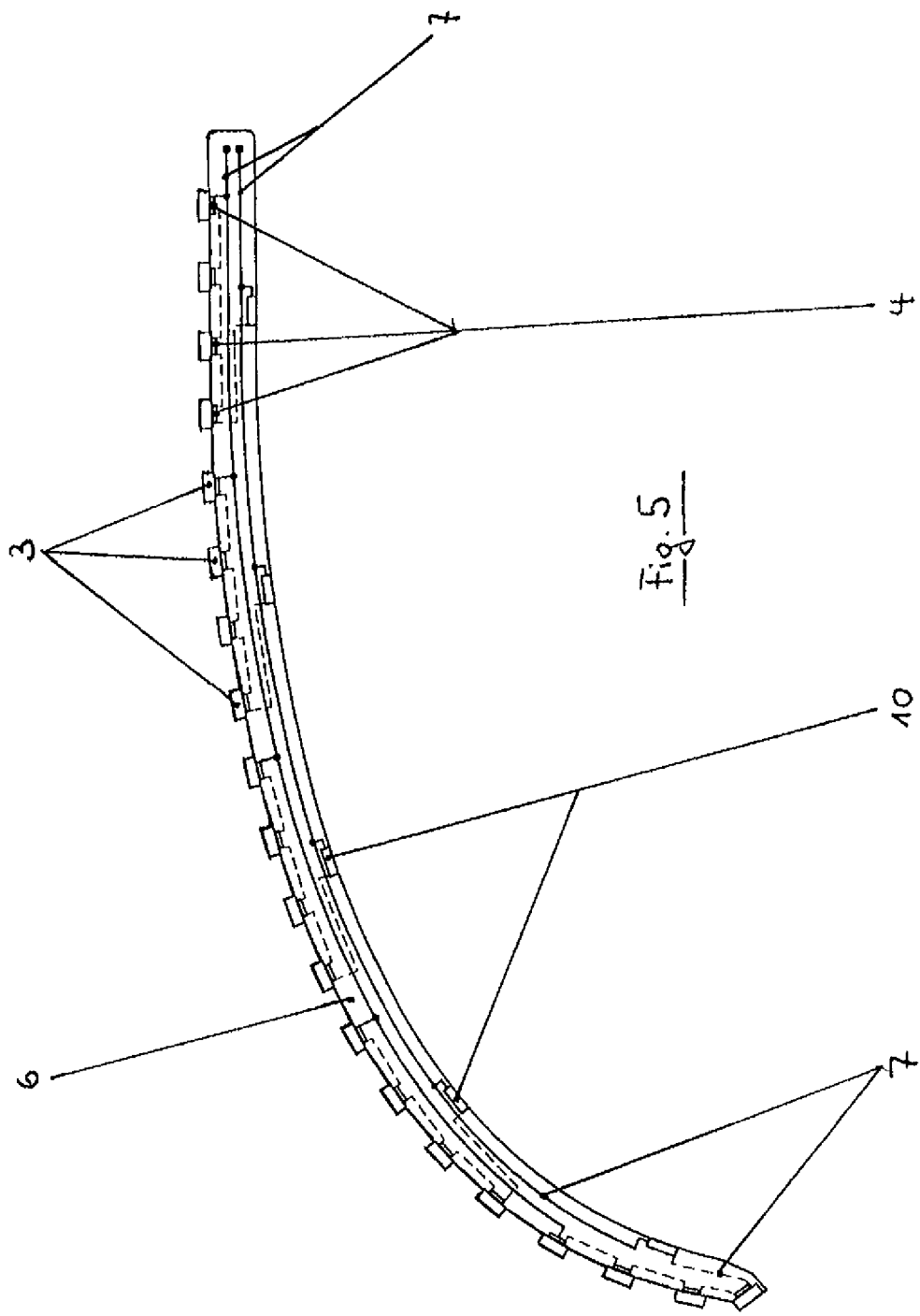

FIG. 5 shows a top view of a curved circuit board 6. Similar to FIGS. 1 through 3, SMD-LEDs are provided as illuminants 3 at the front face of the circuit board 6. On the face opposite to the one where the LEDs 3 are positioned, electronic components 10, which are required for the operation of the LEDs 3 are provided, for instance resistors or capacitors. Such electronic components 10 can be provided in conventional standard versions, or as SMD components.

In FIG. 5 four LEDs 3 each are interconnected into a LED group 17, wherein each unit is assigned an electronic component 10, Through respective selection of the LEDs 3 and the electronic components 10, an optimum combination can be obtained, providing for the longest possible life, lowest power consumption, and least space occupied, wherein all conductive paths and all components are installed onto, or affixed to, the circuit board. This assembly creates the complete illuminant unit 2, which only has to be installed into appropriate housings or receiving devices, and electrically connected.

Due to the curvature of the circuit board 6, the illuminant unit 2 is able to follow the contour of the lighting device or that of the installation cavity. A suitable application could be a lighting unit provided in an exterior rear view mirror housing or in a tail light of a motor vehicle.

Figure 6:
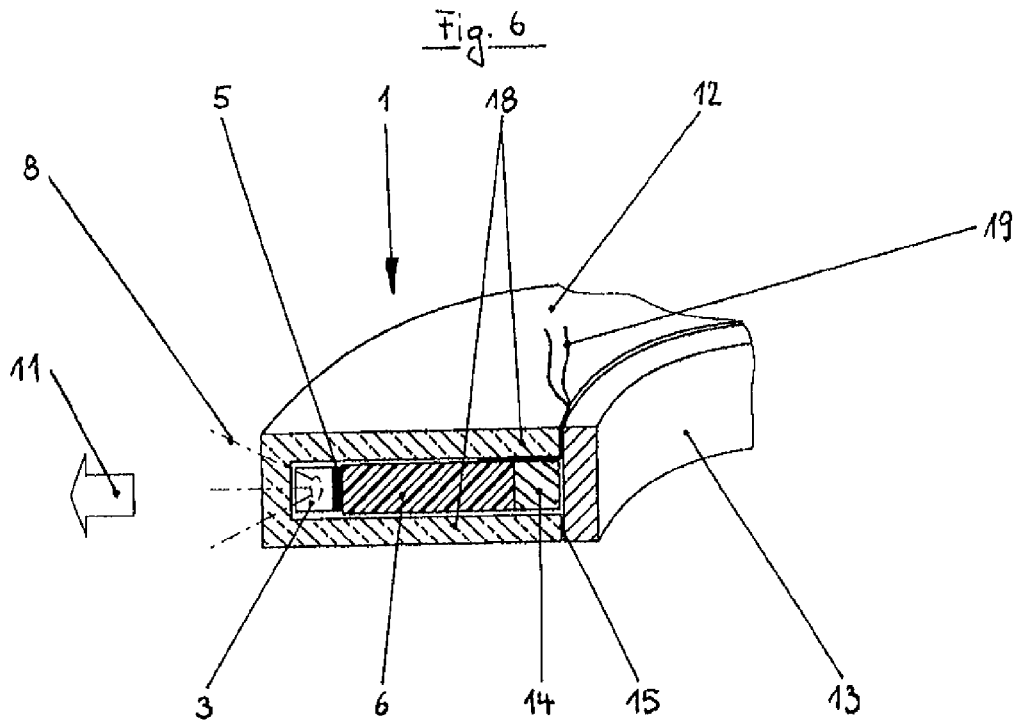

The embodiment according to FIG. 6 depicts a lighting device 1, wherein the illuminant unit 2 is installed in a lighting device housing 13. This assembly is a completely finished lighting device 1, which can, for instance be installed in, or affixed to, motor vehicles, or for other applications.

The lighting device housing 12 is for instance made from a transparent plastic material and is provided essentially U-shaped. Hereby the distance and the length of the two U-shaped prongs 18 of the lighting device housing 12 are determined by the thickness of the circuit board 6, or the width of the illuminants 3 and the width of the respective circuit board 6, and by the height of the illuminants 3. As, for instance, the circuit board thickness and the LED width are very similar in the case of SMD-LEDs, the free space between the two prongs 18 can be very narrow. Typically, several adjacent conductive paths are provided on the utilized circuit board, thus leading to a wide circuit board requiring longer prongs 18. The finished illuminant unit 2 is inserted into this cavity of the lighting device housing 12 and subsequently sealed off with a rear housing wall 13. The rear housing wall 13 in FIG. 6 corresponds essentially to the width of the lighting device housing 12. The joint 15 between the rear housing wall 13 and the front faces of the prongs 18 of the lighting device housing 12 is the contact area between the lighting device housing 12 and the rear housing wall 13, which by means of an appropriate joining method, for instance bonding or welding, connects the two sections tightly with each other. Connecting cables 19 or connecting contacts 19 protrude from this closure area in the area of the joint 15.

In order to prevent the illuminant unit 2 from rattling in the closed lighting device housing, while always being held in a pre-defined position, at least one spring element 14 is provided at the rear of the lighting unit 1 between the circuit board 6 and the rear housing wall 13. This spring element 14 safeguards that the illuminant unit always maintains permanent pre-loaded contact with the inside of the prongs of the U-shaped lighting device housing 12. This spring element can, for instance, be made from foam material, or from a metal or plastic shaped spring element.

Painting or other light shielding measures for the prevention of light escaping laterally from the lighting device is not necessary, since all of the emitted light is being beamed essentially in the main beam direction 11. To this effect, the lighting device housing 12 is translucent at the light emitting face.

Figure 7:
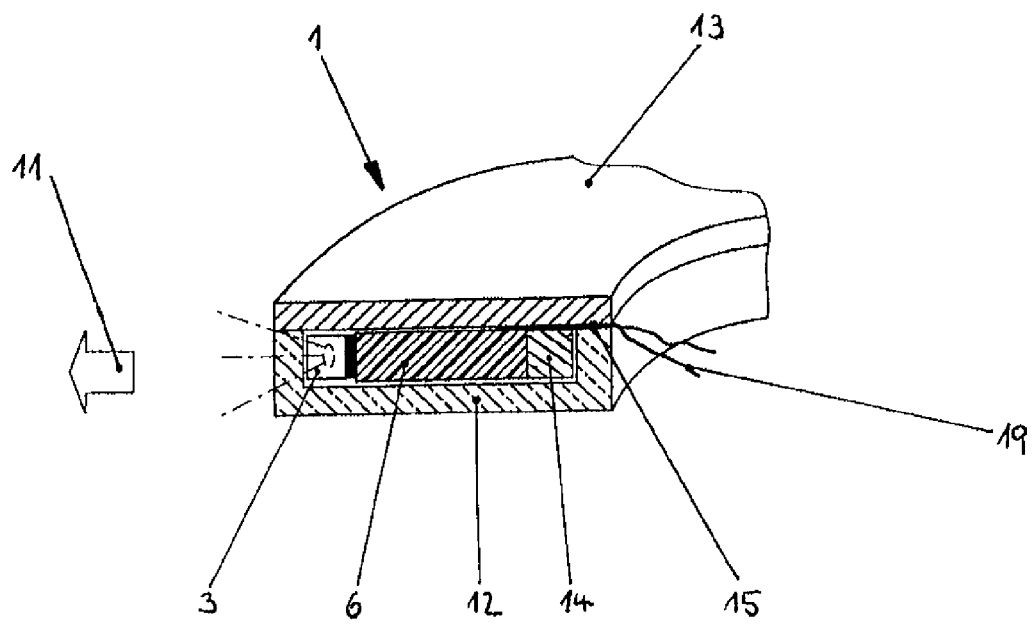

FIG. 7 shows another variant of the configuration of the lighting device housing 12 and the rear housing wall 13. The prongs of the U-shaped lighting device housing 12 in this embodiment form the front and rear walls. On the front faces of the prongs, the housing cover 13 is mounted, whose rims are flush with the exterior surfaces of the front and rear walls of the lighting device housing 12. Upon installation, the illuminant unit 2 is placed inside the lighting device housing 12 and closed in the same manner as described in FIG. 6. Such design of the lighting device housing 12 and the lid 13 is advantageous in cases where the circuit board 6 is e.g. severely twisted, say, in an s-shape, or where the contour of the circuit board is subject to other undercuts.

Figure 8:
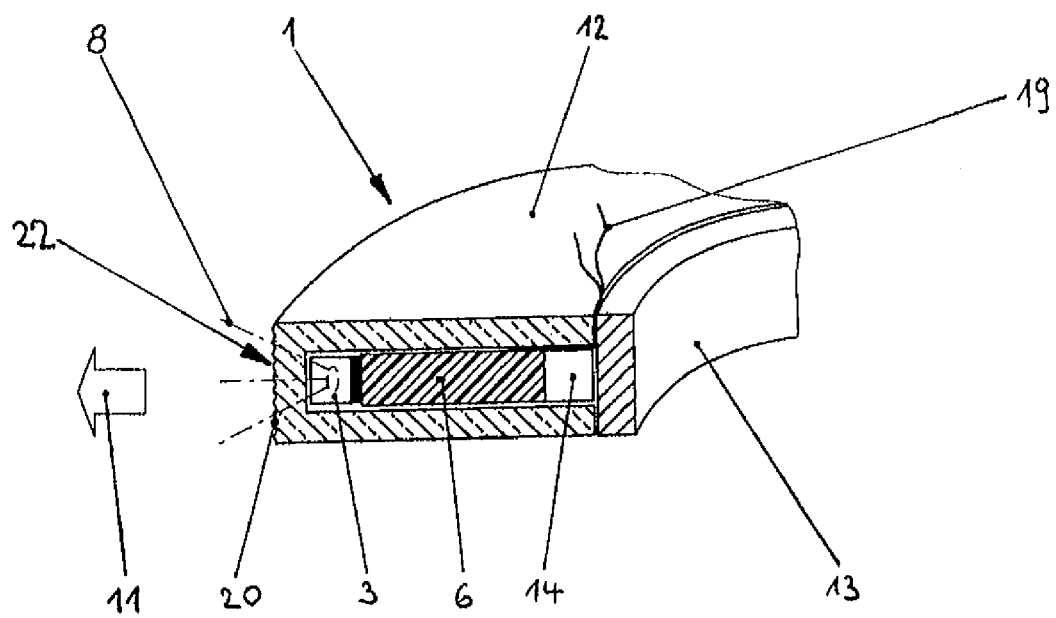
Figure 9:
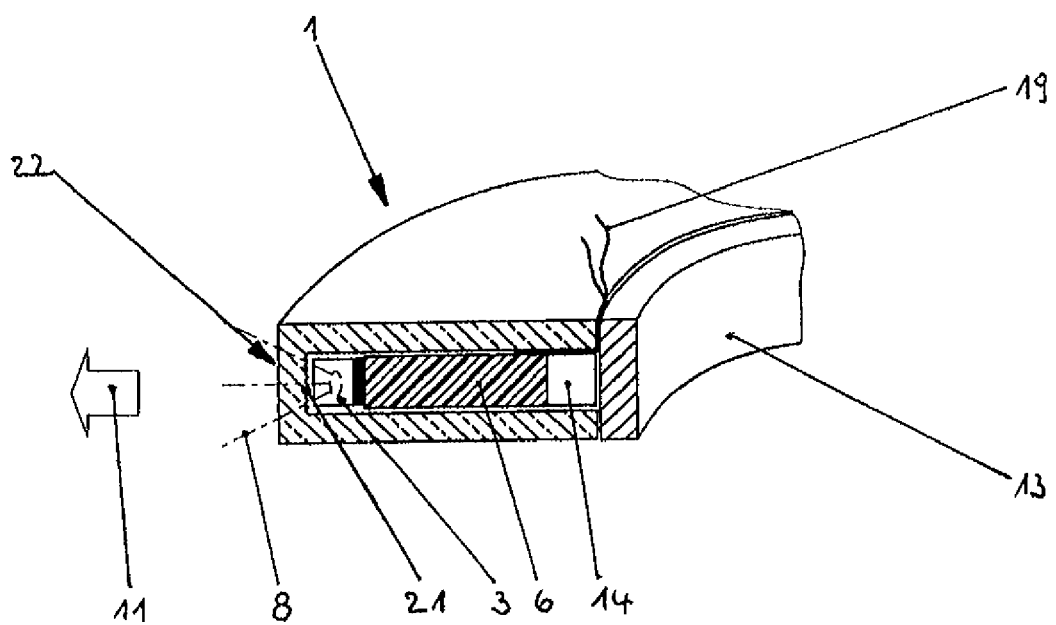

FIGS. 8 and 9 show lighting devices with illuminant units 2, essentially as described under FIG. 6. The main distinctions are that external optics 20 are provided in FIG. 8 in the area of a translucent pane 22, which is provided on the cross member of the lighting device housing adjacent to the illuminants 3. Said optics 20 provide for the emitted light to be focused, parallel oriented, or diffused, depending on the properties of the optics. Mounting the optics 20 on the exterior can be very interesting for design variants. Such lighting devices can also be easily integrated into pre-existing structured surfaces, so that they hardly differ from the surrounding area.

In the embodiment according to FIG. 9 the optics are configured as interior optics 21. Here the exterior of the translucent pane 22 is provided smooth and flat, which is particularly advantageous in case these lighting devices 1 are incorporated flush with outer surfaces of housings for instance, vehicles or vehicle accessories. Said internal optics 21 fulfill the same prospective functions as the exterior optics 20 in FIG. 8. It is advantageous that the interior optics 21 are less susceptible to fouling and/or being damaged.

As per the embodiments shown in FIGS. 6 through 9, these hermetically sealed lighting devices 1 can also be used as so called inserts into molds, e.g. for the manufacture of vehicle tail lights. In this case the lighting devices 1 are integrally incorporated into the entire tail light, wherein the plastic material of the tail light permanently bonds with the lighting device 1, or at least partially encases the lighting device 1. Evidently, the lighting device 1 can also be utilized as an insert in other devices.

Figure 10:
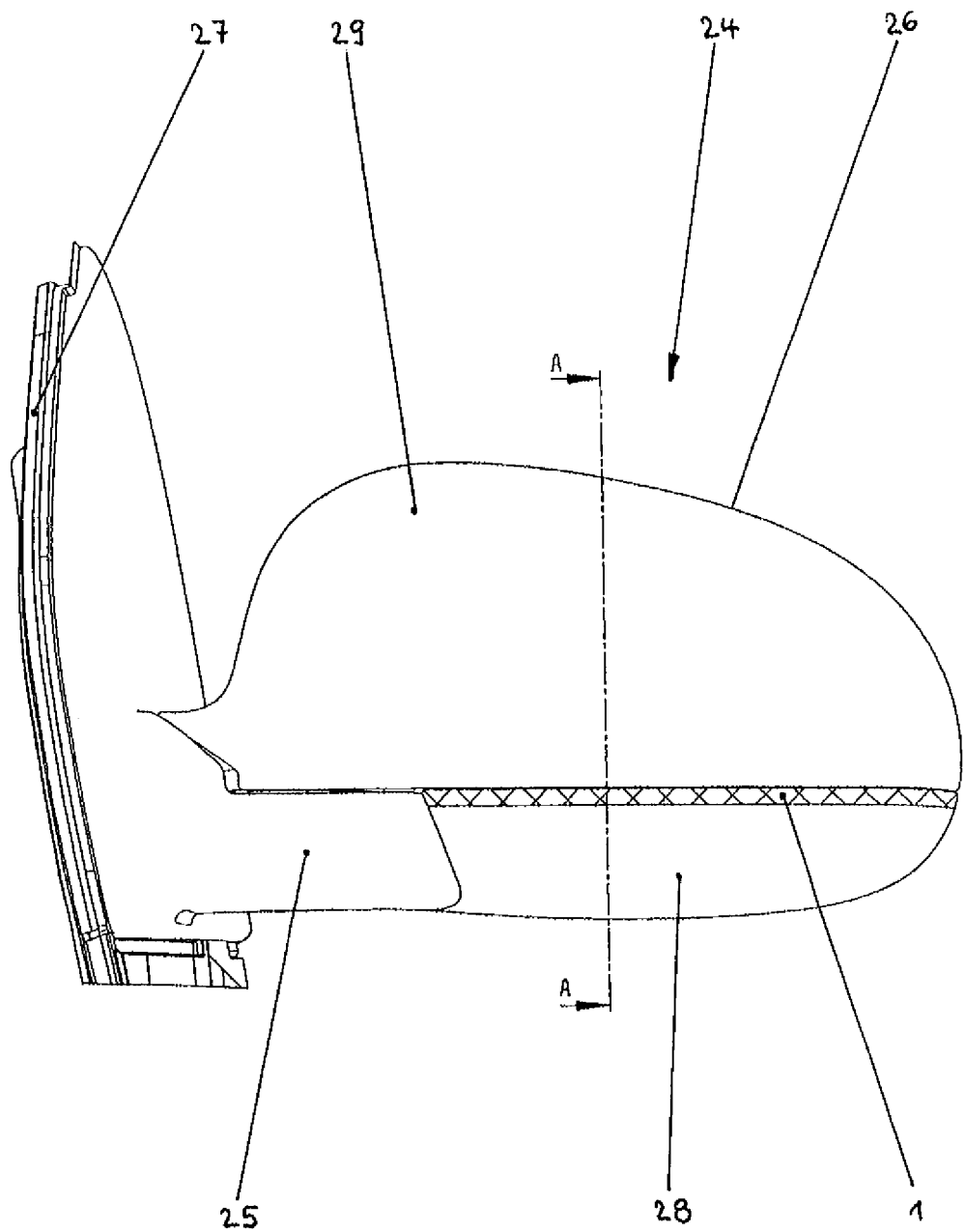

FIG. 10 shows an exterior rear view mirror 24 comprised of a mirror housing 26 that is formed by an upper mirror housing section 29 and a lower mirror housing section 28. The entire mirror housing 26 can be pivoted on a mirror base 25 in or against driving direction. The mirror base 25 has a shape at a connection surface 27, which corresponds to the body area of the motor vehicle, and which has corresponding mounting means.

A lighting device 1 is installed into the joint between the upper mirror housing section 29 and the lower mirror housing section 28. Hereby the lighting device can be comprised of one illuminant carrier 2 or of several closely abutting illuminant units 2. Such flat and small lighting devices 1 are particularly well suited for application in the joining area of two components, as shown in the embodiment per FIG. 10.

Figure 11:
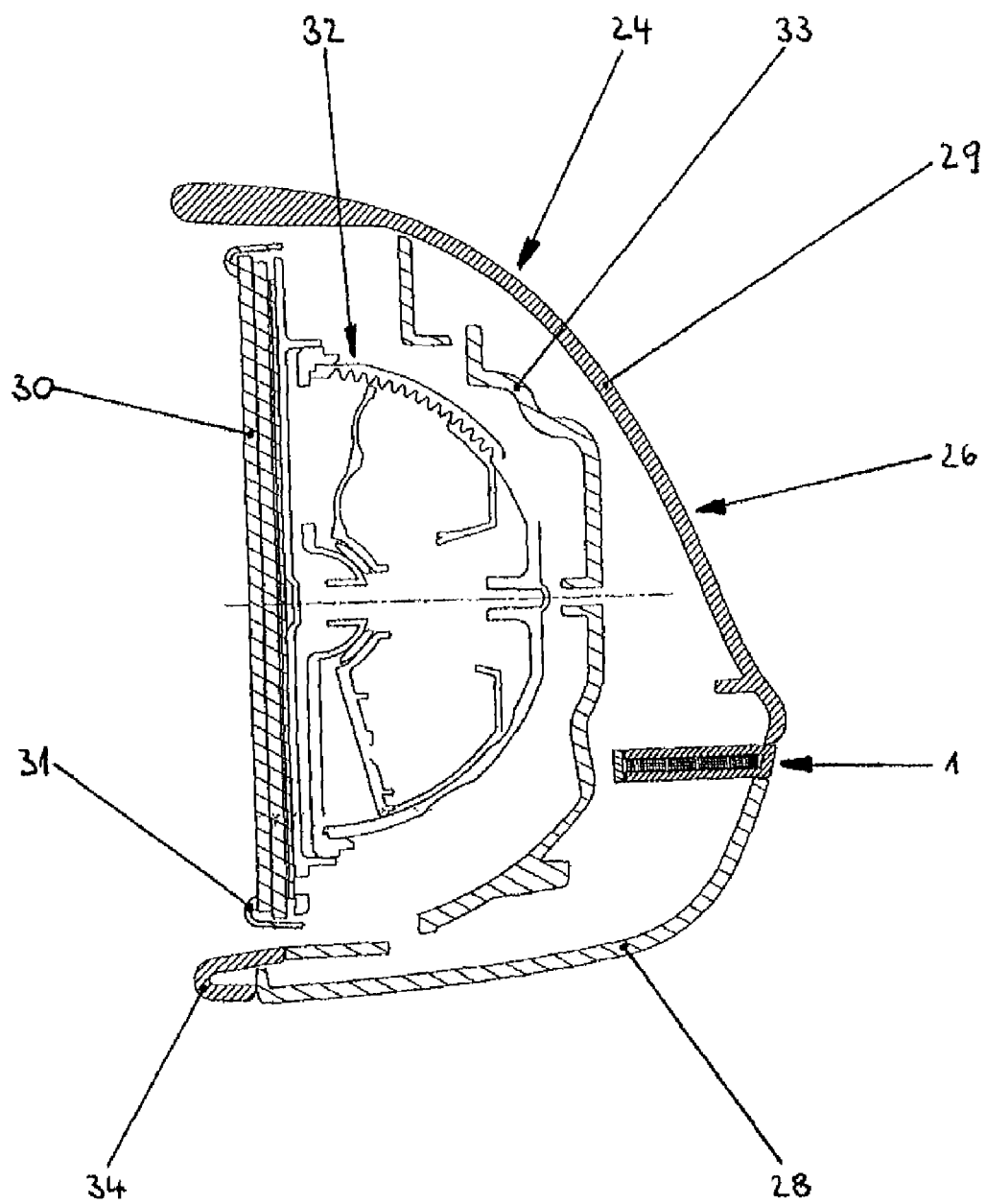

Combinations with further other lighting devices, for instance exit courtesy lights, running lights or daytime driving lights are also possible, wherein the small and particularly flat configuration of these lighting devices 1 is important due to the additionally required installation space of these lighting devices or components This is particularly well displayed in the sectional view in FIG. 11, where, as already described in FIG. 10 the lighting device 1 is disposed in the joint area where the upper mirror housing 29 meets the lower mirror housing 28. Within the mirror housing 26 a mirror adjustment mechanism 32 is disposed, which allows the adjustment of a mirror glass carrier 31 in known manner. It carries a glass mirror 30. As the glass mirror 30 and the mirror adjustment mechanism 32 with the mirror carrier 33 essentially determine the overall dimensions of the external rear view mirror 24, while the aerodynamic design requirements need to be met as well, it is again evident that low installation space requirements are of particular interest. Owing to its small dimensions, the lighting device 1 is light-weight, thus increasing the overall weight of the external rear view mirror 24 only slightly. The positive consequence is that the mirror housing 26 and the mirror carrier 33 can be provided smaller and lighter. This reduction in required space and additional weight obviously signifies considerably lower manufacturing cost.

Within the mirror housing 26 a mirror adjustment mechanism 32 is disposed, which allows the adjustment of a mirror carrier 31 in known fashion. It carries a mirror glass 30.

Figure 12:
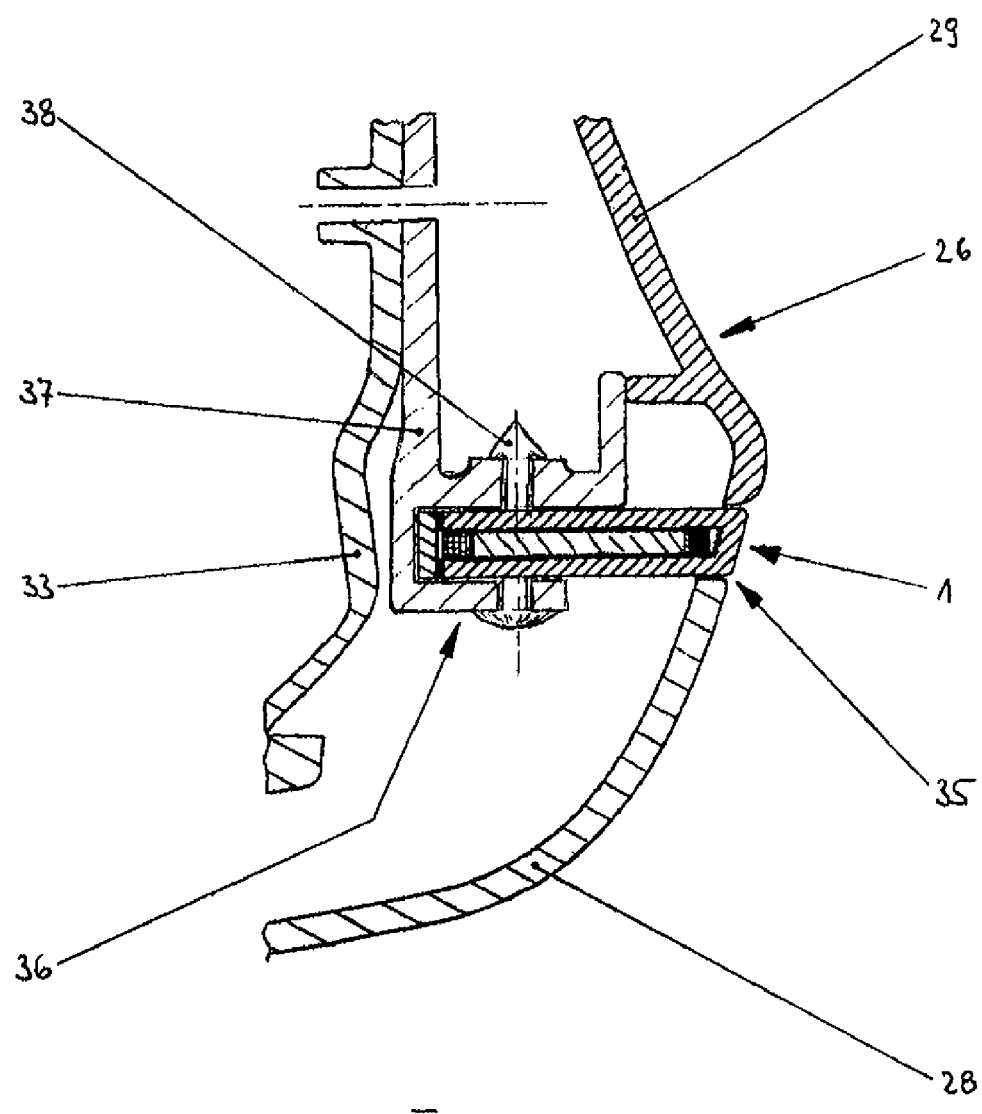

FIG. 12 shows a possible embodiment of how the lighting device 1 can be secured in its position and installed independently from the mirror housing 26. Naturally, many installation variants are conceivable for this, making even an obliquely installed lighting device 1 possible. In the case of an obliquely installed lighting device 1, it is evident that the respective optics 20, 21 per the descriptions of FIGS. 8 and 9 are to be provided. Said optics 20, 21 are required for deflecting the light rays emitted from the lighting device into the primary beam direction 11.

In the preferred lighting device attachment shown in FIG. 12 a lighting device carrier 37 is mounted to the mirror carrier 33 as an additional component. This lighting device carrier 37 has a lighting device receptacle 36 at its free end, which extends into the mirror housing 26. The lighting device 1 is inserted in its installation position into said lighting device receptacle 36, and is immovably secured, in the present example with a clip fastener 38. The depicted fastener 38 thereby reaches through openings in the lighting device receptacle 36 and in the lighting device 1, wherein the openings in the lighting device 1 may be provided as additional grommet or flange shaped onsets. The fastener 38 may also, as shown in this variant, reach through the lighting device, wherein this may have to be restricted to a sector where the illuminant carrier 2 is not impeded. It is appreciated that the lighting device 1 can also be applied to other components, e.g. additional lighting devices or housing components.

The invention claimed is:

1. A rearview mirror assembly for a motor vehicle, said rearview mirror comprising:
   a mirror housing fixedly securable to the motor vehicle, said mirror housing defining an outside contour;
   a mirror disposed within said mirror housing; and
   an illuminant unit fixedly secured to said mirror housing for providing illumination out and away from said mirror housing, said illuminant unit including a circuit board having an edge defining a thickness, an illuminant abutting, secured to and extending out from said edge of said circuit board to minimize effects of vibrational forces, and U-shaped illuminant housing defining two prongs each extending around said illuminant and over all of said circuit board, said two prongs defining a distance therebetween equal to said thickness of said edge of said circuit board, wherein said circuit board and said illuminant housing extend through a curve defined by said outside contour of said mirror housing.

2. A rearview mirror assembly according to claim 1, characterized in that said illuminant housing includes a housing wall, said housing wall seals said U-shaped base.

3. A rearview mirror assembly according to claim 2, characterized in that said illuminant housing includes optics to direct light emitted by said illuminant unit.

4. A rearview mirror assembly as set forth in claim 3 including a spring disposed between said housing wall, said two prongs and said circuit board to dampen vibrations transmitted through said housing wall and said two prongs to said circuit breaker.

5. A rearview mirror assembly as set forth in claim 4 wherein said spring is fabricated from a foam material.

6. A rearview mirror assembly as set in claim 5 wherein said illuminant unit includes a plurality of illuminants disposed along and abutting said edge of said circuit board, said plurality of illuminants extending along said outside contour.

7. A rearview mirror assembly according to claim 6, characterized in that said edge of said circuit board defines a plurality of recesses whereby each of said plurality of illuminants are disposed within each of said plurality of recesses.

8. A rearview mirror assembly according to claim 7, characterized in that the conductive paths are applied on the top and/or bottom surfaces of the circuit board.

9. A rearview mirror assembly according to claim 7, characterized in that the contacts of the illuminants are connected to the conductive paths of the circuit board by means of adhesive bonding.

10. A rearview mirror assembly according to claim 7, characterized in that the contacts of said plurality of illuminants rest upon top and/or bottom surfaces of said circuit board in a planar manner in the area of the conductive paths.

11. A rearview mirror assembly according to claim 7, characterized in that each of said plurality of illuminants are SMD-LEDs.

12. A rearview mirror assembly according to claim 7, characterized in that at least two illuminants units are electrically connected and joined into a group such that said illuminant units are stacked one on top of the other.

13. A rearview mirror assembly as set forth in claim 6 wherein said mirror housing includes and upper housing part and a lower housing part wherein said upper and lower housing parts define a seam along said mirror housing.

14. A rearview mirror assembly as set forth in claim 13 wherein said illuminant unit is disposed within said seam.

* * * * *